United States Patent [19]

Holahan et al.

[11] Patent Number: 4,714,208
[45] Date of Patent: Dec. 22, 1987

[54] MAGNETIC BRAKE CONTROL FOR FISHING REEL

[75] Inventors: Joseph M. Holahan; J. Myles Holahan, both of Anderson, S.C.

[73] Assignee: Ryobi American Corporation, Bensenville, Ill.

[21] Appl. No.: 776,488

[22] Filed: Sep. 16, 1985

[51] Int. Cl.[4] .............................................. A01K 89/02
[52] U.S. Cl. ............................. 242/84.52 B; 254/275; 310/93
[58] Field of Search .................. 242/84.1 R, 84.52 R, 242/84.52 B; 310/93, 105; 254/275, 362

[56] References Cited

U.S. PATENT DOCUMENTS

| | | | |
|---|---|---|---|
| 2,550,861 | 5/1951 | Ransom | 242/84.52 B |
| 2,588,837 | 3/1952 | Holm | 242/84.52 B |
| 3,675,870 | 7/1972 | Ride et al. | 242/84.1 A |
| 4,402,470 | 9/1983 | Hamayasu | 242/84.52 R |
| 4,418,491 | 12/1983 | Christiansen | 242/84.1 A |
| 4,535,954 | 8/1985 | Worth et al. | 242/84.52 B |

FOREIGN PATENT DOCUMENTS 58-100570  7/1983  Japan .............................. 242/84.52 B Primary Examiner—Billy S. Taylor
Attorney, Agent, or Firm—J. Helen Slough

[57] ABSTRACT

A bait cast fishing reel includes electronic timing circuitry for controlling deceleration of the spool thereof, about which fishing line is wound and playing out. The spool is mechanically released and the timing circuitry is activated by the pressing of a control button. When a casting sequence is commenced, the timing control allows the spool to first rotate freely for a preselected period of time. A second phase of the timing circuitry then applies a spool braking mechanism for a preselected time period. At the completion of this second period, the timing circuitry again releases the spool for manual braking by thumb pressure. Rewinding the spool resets the timing circuitry for the next cast, and disconnects power from the circuitry.

12 Claims, 8 Drawing Figures

MAGNETIC BRAKE CONTROL FOR FISHING REEL

BACKGROUND OF THE INVENTION

This invention relates to improvements in fishing reels and in particular to a fishing reel having a revolving spool including means to electrically change the speed of rotation of the spool or similar device and more particularly to decelerate or stop the direction of rotation of the spool.

Construction techniques of fishing reels may be broadly catagorized into basic groups. A first group, referred to as "bait casting reels", includes a spool with an axis generally perpendicular to that of a fishing pole. The typical bait casting reel includes a clutch release button which will allow the spool to pivot freely about its axis, and further allow fishing line to be easily taken from the spool. These types of reels also include a drag mechanism by which line may be pulled from the reel with an effort dependent upon the particular setting at which it is set. In this way, the drag mechanism functions to allow a fish to be tired out by unreeling line, without the corresponding risk of snapping the line. In a typical casting situation, a weight is placed on the free end of the fishing line, and the clutch release button is depressed. The weight is cast in a direction of desired placement. While line is played out, manual pressure of the fisherman's thumb is used to decelerate the spool. Even with a great deal of expertise, care must be taken to slow the rotation of the spool of a reel after a cast release to prevent overrun and subsequent entanglement of excess line flowing from the spool.

A second group of reels referred to as "spinning reels", were created with the axis of the reel spool parallel to that of the fishing rod. In such reels, overrun after casting was generally prevented, but other disadvantages resulted. The spinning reel could not hold the quantities of line as could the bait casting reels. Also, the spinning reels are generally not as adaptable to heavy line or extremely heavy loads. For these reasons, bait casting reels are often deemed more desirable, hence dictating the need for improvements.

In the past, bait casting reels have been provided with magnetic means for preventing the overrunning of the fishing reel spool as set forth in U.S. Pat. No. 2,361,239 to Ransom, granted Oct. 24, 1944 which disclosed the use of a pair or more of permanent magnets disposed radially of the hub in spaced apart opposed relationship. A braking member is disposed in an air gap between the sets of magnetic elements. A member suitably secured to supporting framework for the pairs of magnets has a lateral flange supporting the magnet members and the braking member has a flange disposed in the air gap between the magnet elements. As the flange moves into the magnetic fields existing in the gap, eddy currents will be set up in the braking member which tend to brake rotation so that whenever a rotation-producing force is no longer present the spool will rapidly slow down and overrunning is prevented. When casting, the line is played out from the spool and the magnetic elements exert a drag or braking effect on the element. Means are provided for varying the retarding force or drag on the spool. The braking is therefore hysteresis in its effect and means are provided to adjust the same.

In U.S. Pat. No. 2,482,428, a pair of oppositely operating permanent magnets are disclosed facing in opposite directions on opposite side faces of the hub of the reel serving as brake surfaces to effect various degrees of drag or braking. As the speed of the spool increases the braking decreases and as the speed of the spool decreases the braking effect takes place. When the spool is not in motion, a cast may be made without the necessity of applying thumb pressure to the spool at the beginning of the cast.

A second patent to Ransom, U.S. Pat. No. 2,550,861 also teaches the use of hysteresis braking wherein magnets are disposed about the axis of the spool spindle and the magnets act as a governor. When the spool is rotating, during casting for example, eddy currents are generated in discs of a damping unit and the magnetic disc acts as a revolving flux path to opposite poles of the magnet increasing the flux density through the non-magnetic disc. The hysteresis brake may be adjusted to vary the restraining effect thereof to changing the amount of drag on the reel during a casting operation.

In U.S. Pat. No. 3,116,892, to Pickard, the spool is operated by means of an electric motor mounted coaxially within the hub of the spool, the hub consists of an armature and a commutator mounted to rotate with the motor rotor. A pair of permanent magnets are positioned in close proximity to the armature. A switch is actuated to energize the D.C. motor and the speed at which the armature rotates is determined by the position of permanent magnet bars with relation to the armature. To reverse the rotational movement of the spool a switch pin is activated in an opposite direction.

U.S. Pat. No. 3,351,300 to Nagy discloses an electrically powered spinning type fishing reel. The motor is operated by battery means and is energized to reel in the line whenever the pull on the line is relaxed; the motor circuit is closed when the line is being dragged out by the fish. Reverse driving of the motor causes it to function as a generator for recharging the batteries. The reaction of the motor to any release of tension in the line is assertedly automatic and instantaneous in resuming the reel-in operation and any resistance to playing out of the line during casting is eliminated.

U.S. Pat. No. 3,675,870 to Ride discloses an electric fishing reel for fly fishing having a small electrical machine of the inducer type which functions as a dynamo brake to control unwinding of the line from the reel drum and as a motor to rewind it. The motor has a permanent magnet and a switch is employed to cause it to function as a motor, or short-circuited directly or through resistance to function as a dynamo brake.

U.S. Pat. No. 4,013,241 to Gray discloses a magnetic braking and clutch system utilizing magnetic lines of flux and co-acting elements to provide a braking action on a rotated member whereby automatic detection of a reduction of line tension on a rotating line spool is obtained and in substance a braking action effected to terminate spool rotation.

U.S. Pat. No. 4,402,470 to Hamayasu relates to a fishing reel which has a spool shaft; the spool is rotatable by reason of the disengagement of a clutch and the reel is provided with a detector which detects line drawing-out speed and has a second detector which detects the rotational speed of the spool. The reel has an actuator which controls application of rotational resistance against free rotation of the spool. The detector means employed are described as being a luminous element such as a light-emitting diode and a photo-transistor and alternatively as magnetic detection means wherein the line is attached or coated with a magnetic substance. The detectors emit a pulse signal to compare the line drawing-out speed to detect the amount of backlash and are adapted to actuate a braking device. If the rotational speed of the spool is larger than the line drawing-out speed during the casting and a backlash is about to occur, the detection signals from the detectors detect this and actuate the braking device to apply rotational resistance to the spool. The rotational resistance exerts braking action on the spool so that the same rotates at low speed or stops.

A disadvantage to the braking mechanisms heretofor presented is that the control afforded to manual reels, with which the fisherman could manually place the line in a desired area through exertion of pressure onto the reel with his thumb, is forfeited with automatically continuously braking reels. Accordingly, it would be desirable to have a bait casting reel which will allow for free rotation of a spool during a casting sequence, with subsequent slowing or braking for a preselected period of time, with the final braking or stopping able to be accomplished manually by a fisherman. In this way, an increased margin of error against overspin would be provided, without forfeiting the ability to manually select the final position of the fishing line.

In the present invention, a revolving spool type fishing reel is provided with an electric generator to act as a dynamo brake in order to inhibit backlash. At a predetermined time interval after the start of a cast, an electrical load is placed across the generator by means of an electronic switch; the generator remains loaded for a predetermined period of time then the electrical load is switched off, and the spool coasts until it is stopped by the fisherman's thumb. The generator preferably is a small permanent magnet generator attached to the spool spindle. The magnitude of the current generated increases as the speed of rotation of the controlled body increases in the permanent magnetic field. The generator converts Kinetic energy of rotation into electrical energy when an electrical load is placed across the generator. This load is placed on the generator by an electric switch. Such loading dissipates some of the rotational energy of the spool and acts as a controlled brake during the cast to reduce spool overspin or backlash.

DETAILED DESCRIPTION OF THE PREFERRED EMBODIMENT

Figure 1:
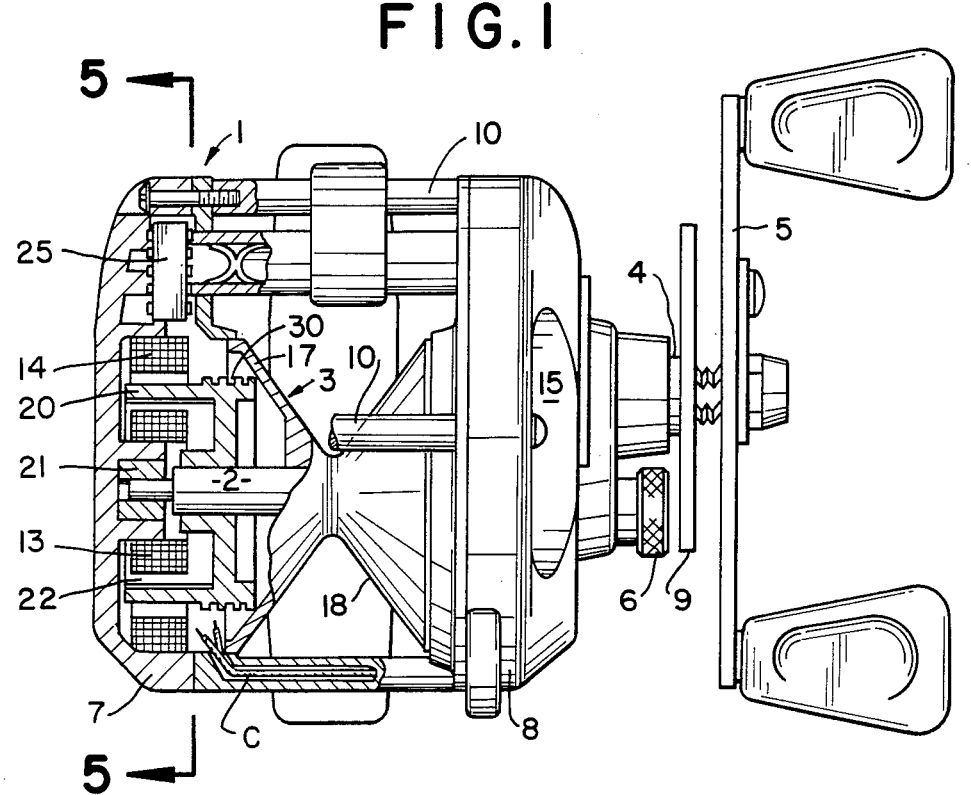
FIG. 1 is a top plan view of the reel of our invention with parts broken away in the interest of clearness; a dynamo mounted at one side of the reel is illustrated. It comprises: two concentric sets of external and internal magnets, disposed radially about the hub in such a way that fields are created across an air gap by opposite north and south poles; an armature attached to the spool shaft, radially symmetric to the shaft and concentric to the magnets.
Figure 2:
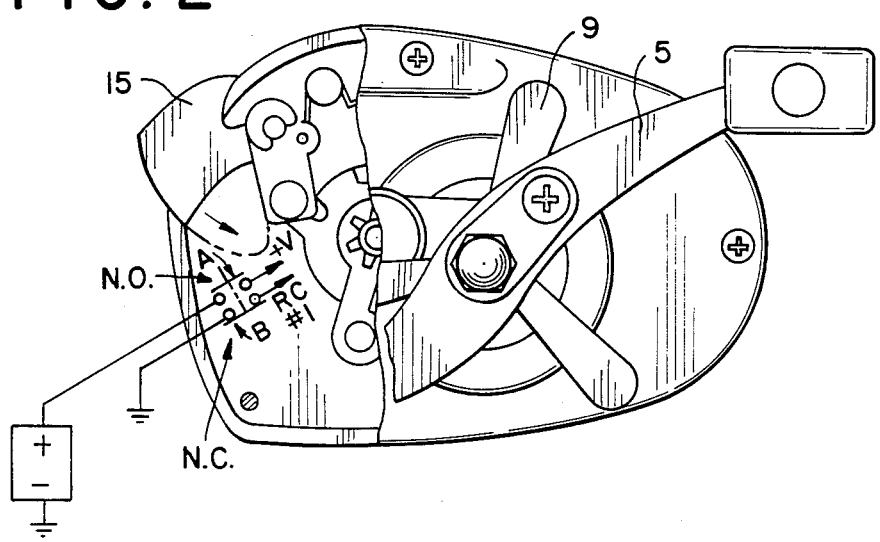
FIG. 2 is a right side view of the fishing reel of FIG. 1 showing the cover partly removed and discloses the free spool button and switching mechanism used to initiate first free spin, and then deceleration or slowing of the rotation of the spool.

Referring now to the drawings, in all of which like parts are designated by like reference characters, in FIG. 1 is shown a fishing reel of the so-called "spool" type having a body support 1 supporting a line collecting and dispensing spool 3; the frame is provided with left and right side end plate members 7 and 8, a spool shaft 2 journalled in the body frame, a handle shaft 4 carrying a crank handle 5, and drag mechanism 9 mounted, as shown in FIG. 1, on the right side of the reel, in spaced but adjacent relation to the handle 5. Spool and play adjustment means are shown at 6. The frame and plates 7 and 8 are secured in spaced relation and are cross-connected by a plurality of rods 10 located at intervals around the periphery of the end plates 7 and 8. On the right side of the reel, as shown in FIG. 2, a movable free spool button or thumb bar 15 is disposed which is adapted to be depressed before a cast to contact a double throw switch 16 which, as shown in FIG. 2, either opens or closes the circuit as indicated at A and B.

Figure 3:
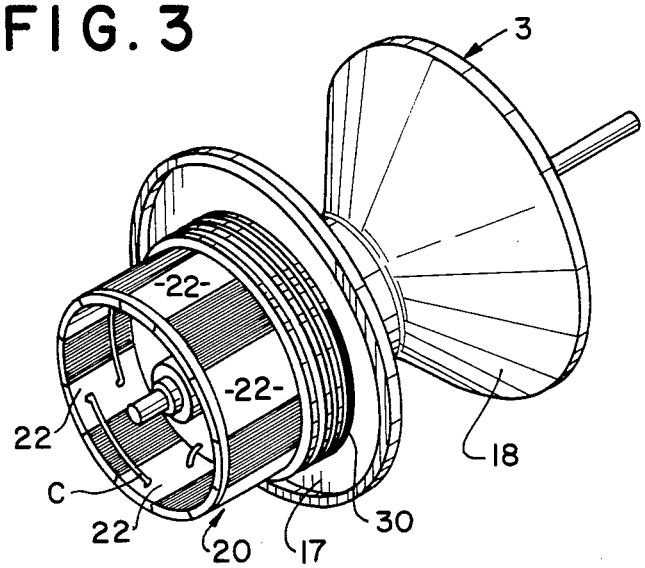
FIG. 3 is a perspective view of the spool and illustrating a permanent magnet generator attached to the rotating axis thereof.
Figure 5:
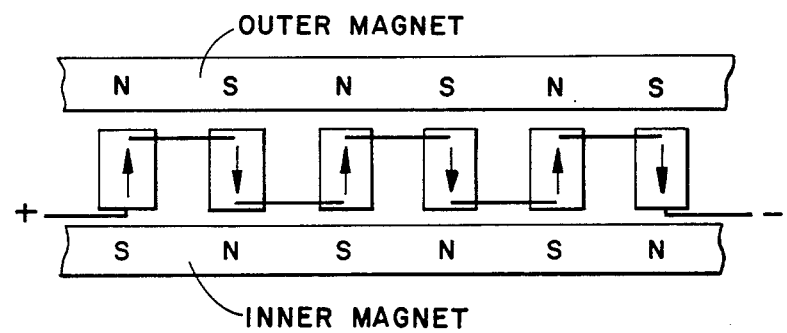
FIG. 5 is a block diagram showing the pattern of polarity between the interior and exterior magnet segments.

The spool 3 may be made of any suitable material, such as metal or plastic material, and is provided with a hub 19 and flanges 17 and 18 gearing and clutch as shown in U.S. Pat. No. 4,402,470 to Hamayasu (not shown) are employed. A phenolic or other non-conductive material rotor 20 is mounted on the spool shaft 2 and disposed adjacent to the left flanges of the spool, as best shown in FIGS. 1 and 3. As shown, a dynamo 21 is embedded in the rotor 20. Its amature preferably consists of approximately six spaced conductive elements 22, arrayed in series, which are molded into the rotor and employed to induce a current in the armature. As shown, a generator of the inductor type having permanent magnets comprises two concentric magnet assemblies 13 and 14, the magnet assembly 13 being an external system and the assembly 14 an internal system. The generator is contained within the end plate 7 of the frame and the conductive elements 22 are positioned in a gap between the said magnet systems. The polarity of the inner and outer magnets 13 and 14 is indicated in FIG. 5.

Figure 4:
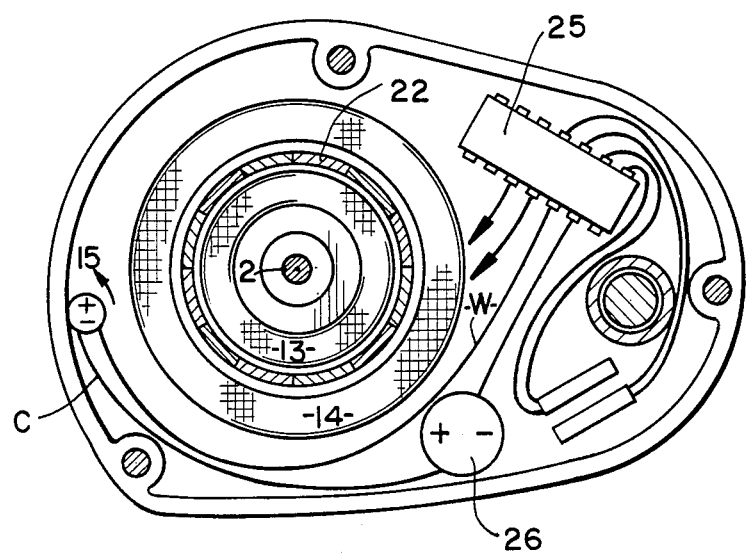
FIG. 4 is an end view of the reel with the housing removed to disclose positioning of an integral circuit, the wiring for the free spool button and a battery for energizing the timing circuits, and a braking timer.
Figure 6:
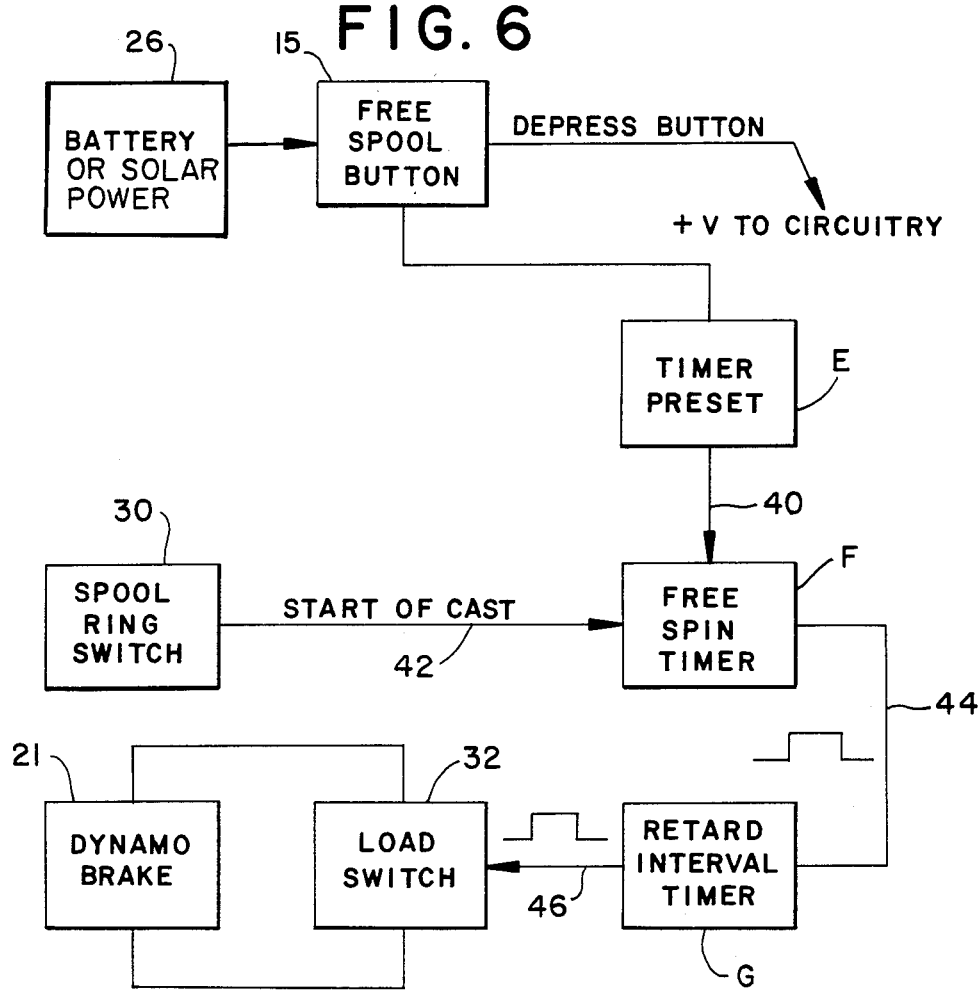
FIG. 6 is a functional block diagram illustrating the operation of the invention.

As shown in FIG. 1, a control circuit which may be in the form of an integrated circuit 25 is mounted in the end plate 7 and is powered by a battery or solar cells 26 through wiring which is shown in FIG. 4, and diagrammatically in FIG. 6. The integrated circuit is designed to provide a timing sub-system for the cast sequence as described herein. Connecting wires w or leads from the battery to the integrated circuit 25 and wires c to the spool button 15 through the frame post are shown in FIGS. 1 and 4.

A casting sequence is commenced by depressing the spool button 15. This mechanically frees the spool 3 for rotation, and engages the electronic circuitry of the present invention by action of the switch 16.

The operation of the present invention after a cast is commenced is as follows: The spool is allowed to freely rotate for a predetermined time. Thereafter, an electrical load is placed across the generator. The generator remains loaded for a predetermined short interval of time to retard spool velocity. The load is then switched off and the spool allowed to coast until fully stopped by pressure of the fisherman's thumb thereon. Finaly, power is removed from all circuitry and the timing circuits are reset, as soon as the spool starts to rewind line.

Figure 8:
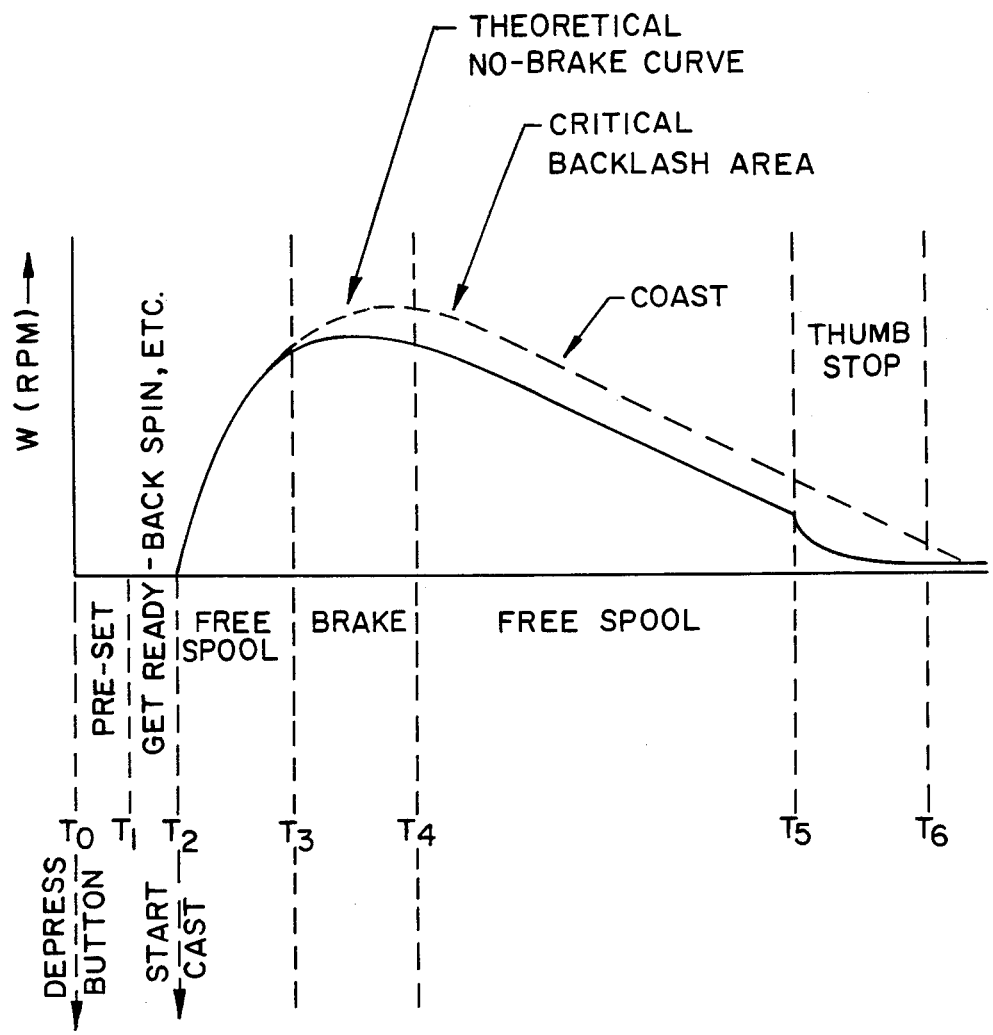
FIG. 8 is a graph representing relative rotational velocity of the reel of the invention as a function of time.

FIG. 8 represents graphically, the angular velocity (omega) of the spool 3 as a function of time. At $T_o$ the free spool button is depressed, and preset is commenced. The preset interval $T_0$ to $T_1$ requires several milliseconds. By $T_1$ the circuitry is preset, and casting can be commenced any time thereafter. The start of the cast is arbitrarily assigned the time $T_2$. The fisherman can take any reasonable time to start his cast. Just after the cast is started, the spool rotates freely for an interval represented by $T_2$ to $T_3$. At time $T_3$, the electrical braking mechanism is engaged, which exerts a deceleration drag upon the spool 3 until $T_4$. The spool may again then freely rotate, until the fisherman stops the reel fully by pressure from his thumb, as is depicted by the interval between $T_5$ and $T_6$. A mechanism for accomplishing this is described below.

The ring switch 30, embodied in the rotor 20 with the spool assembly 3, provides switching to trigger a previously enabled timing circuit upon the first of several spins of the spool. The above-noted R.P.M. sequence of FIG. 8 is then commenced. At the completion of a casting sequence, the crank handle 5 is turned to rewind the spool 3. Rewinding the spool 3 causes the switch 16 to open the line w and break the circuit to the battery 26. The timing circuit will thus be de-energized. The battery or solar cell 26 is thereby used only during the cast period. The ring switch 30 on the spool rotor 20 may be designed in several different ways. However, for the purposes of this intention, we have disclosed a narrow band mounted on the rotor 20 concentric to the spool shaft 2 as best shown in FIGS. 3 and 4. This circumferential band has some of its circular periphery coated with a conductive or magnetic material while the other part of the sector is non-conductive. Two probes (not shown) are preferably located tangent to, or perpendicular to, the segmented conductive circle. As the spool rotates a pulse of voltage, or a variation in air-gap resistance, will send a signal to the micro-chip for each revolution of the spool. The spool revolution count will start after the free-spool button 15 is pressed to activate the micro-chip control circuit.

The diagrammatic block diagram of FIG. 6 illustrates the sequential operation of the elements of the invention. The free spool button 15 is depressed to commence the casting procedure by mechanically releasing the spool 3 (FIG. 1). The battery or solar cell 26 is thereby engaged to supply power to the general circuitry and simultaneously the timer preset circuit E is activated. When so activated, a signal is presented along line 40 to the timer F which presets it, thereby getting it ready for a cast. At the commencement of a cast, the spool ring switch 30 presents a signal along line 42 to timer F. When this signal is presented, the timer F commences timing for a preselected first period. After the first time period has elapsed a signal is presented along 44 to commence operation of retard interval timer G. The timer G applies a braking signal along 46 during a second preselected period of time. While the signal at 46 is present, the load switch 32 applies load to the dynamo brake 21 to retard or decelerate the spool 3. At the completion of the second preselected time interval, the signal at 46 is removed from the load switch 32, and the dynamo brake 21 is disengaged.

Figure 7:
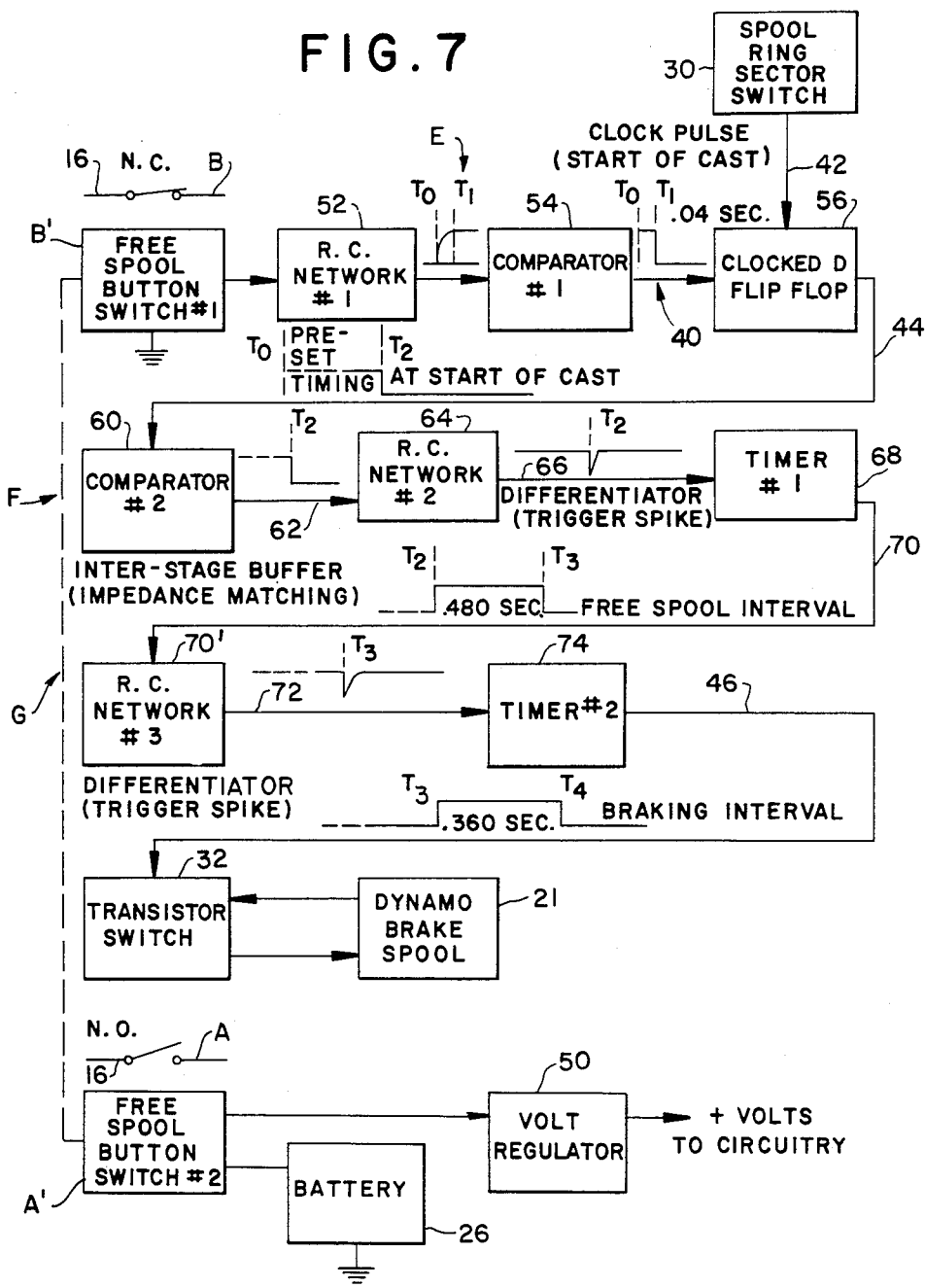
FIG. 7 is a block diagram of the circuitry employed in the invention.

FIG. 7 illustrates a preferred circuit for accomplishing the algorithm of FIG. 6, resulting in the relative rotational velocity illustrated by FIG. 8. When viewed in conjunction with FIG. 6, the timer preset circuit is indicated generally at E, the free spin timer is indicated generally at F, and the retard interval timer generally indicated at G. The normally closed mode at switch contact B is indicated in block diagram form at B'. The normally open mode at switch contact A is indicated in block diagram form at A'. Referring first the bottom portion of FIG. 7, engaging the free spool button 15 (FIG. 2) completes the circuit at A', thus interconnecting the battery 26 with a voltage regulator 50 to supply a constant voltage to and thereby enabling the electronic circuitry of the invention, as will be further described below.

Looking to the top portion E of FIG. 7, the normally closed portion of spool switch B' is opened upon depression of the spool button 15 (FIG. 2). A signal is presented to a first resistive/capacitive (RC) network 52, which is amplified (impedance buffer) by a first comparator 54 which may comprise an operational amplifier and associated circuitry as is wellknown in the art. An amplified signal is thereby presented at 40 to the D input of a clocked D flip-flop 56. It will be recalled that a signal at the D input of such a flip-flop will cause a corresponding output line to generate a signal, when enabled by a signal at the clock input. The spool ring sector switch 30 provides a signal 42 to the clock input of the flip-flop 56 by the rotation of the spool 3 at the commencement of a casting sequence. This clock pulse initiates an output signal at 44 which will remain until the battery 26 is disconnected upon rewind. A second comparator 60 receives the signal 44 from the output of flip-flop 56. As with the first comparator 54, the second comparator 60 may be comprised of circuitry including an operational amplifier. The output signal at 62 (specifically, but not necessarily, a trailing edge of a voltage pulse) is virtually co-incident with the signal from the ring section switch 30. It is produced at the start of a cast and is arbitrarily designated as occuring at time $T_2$. The signal at 62 forms the input for a second RC network 64, which functions as a differentiator to form a trigger spike signal at 66, again virtually co-incident with time $T_2$. The spike signal 66 forms the trigger input for #1 timer 68, which forms a signal at 70. The output signal at 70 is a pulse, commencing virtually at $T_2$ and lasting until $T_3$. The duration of this pulse establishes the free spool interval $T_2$ to $T_3$, an interval wherein the spool rotates freely about its axis. This interval is generally between 0.4 and 0.5 seconds in duration, and optimally 0.48 seconds in duration. (Note: The actual length of this interval is dependent on the mechanical properties of a specific model of reel, such as spool mass, spool form, line mass, and mechanical friction. A specific duration for the free spool interval or the braking interval is not a critical part of this invention). A third RC network 70' forms a trigger spike signal at 72 co-incident with $T_3$. The trigger signal at 72, in turn, forms the input for a second timer 74, which dictates a braking interval signal at 46. The braking interval signal at 46 is a preselected interval between $T_3$ and $T_4$. (See note above on interval duration.) During the braking interval a transistor switch 32 loads the brake generator 21, causing a deceleration of the spool 3.

It will be noted that other circuitry may function equivalently to that of the preferred embodiment noted above. For example, a one-shot or monostable multivibrator may be a substitute for the comparators and corresponding RC networks. For the purposes of the invention, the integral circuit can be provided with alternative systems for accomplishing the results of the present invention, which provides means for avoiding backlash by providing timed intervals, i.e., an initial interval of free rotation, a second interval of electrically produced deceleration by an electronically controlled dynamo brake, and a remaining interval of free rotation when spool overrun is no longer a problem.

While we have described and shown our invention in connection with a preferred embodiment thereof, it is to be understood that numerous and extensive departures may be made therefrom without, however, departing from the spirit of our invention and the scope of the appended claims.

What we claim is:

1. A fishing reel comprising a frame, a revolving spool mounted on a spool shaft connecting end members of the frame of the reel, a rotor mounted on the spool shaft, conductors carried by the rotor, a dynamo brake positioned adjacent to one of said end members of the frame, an electronic control means and timing means for controlling said brake, a source of direct electrical current, switch means, an actuator adapted to actuate said switch means to close the electrical circuit to active said electronic control means and timing means for braking of the spool for a selected time and to open said switch to release the spool from braking for a selected time.

2. A fishing reel as claimed in claim 1, wherein the control means is embodied in an electronic integrated circuit.

3. A fishing reel as claimed in claim 1, wherein the control means is embodied in an electronic integrated circuit, and the source of direct current activates the electronic control circuit and energizes the timing circuit.

4. A fishing reel of claim 1, wherein the circuit means is adapted to generate a braking signal after a preselected freely rotating spool interval commencing with spool rotation.

5. The fishing reel of claim 4, wherein the circuit means is adapted to generate a braking signal after a preselected freely rotating spool interval commencing with spool rotation, and the said freely rotating spool interval is between 0.4 seconds and 0.5 seconds and the braking interval is between 0.3 seconds and 0.4 seconds.

6. The fishing reel of claim 4, wherein the circuit means is adapted to generate the braking signal after a preselected freely rotating spool interval commencing with spool rotation, and the control circuit means further includes an enabling circuit having a control switch for selectively generating an enabling signal.

7. A fishing reel comprising a spool adapted to rotate about an axis; a means for generating a spool rotation signal in accordance with rotation of the spool; control circuit means for generating a braking signal including a braking signal for a predetermined braking interval after detection of the spool rotation signal; and, a means for selectively braking the spool in accordance with the braking signal, wherein the circuit means generates the braking signal after a preselected free spool interval commencing with spool rotation and the control circuit means further includes an enabling circuit having a control switch for selectively generating an enabling signal, and further includes a free spool interval timer circuit responsive to the enabling signal and the spool rotation signal, for selectively generating a free spool signal representative of the free spool period.

8. The fishing reel of claim 7, wherein the means for generating the braking signal includes a braking timer selectively operable in response to the free spool signal.

9. The fishing reel of claim 7, wherein the circuit means generates the braking signal after a preselected free spool interval commencing with spool rotation, and the means for braking the spool is a dynamo.

10. The fishing reel of claim 7, wherein the means for generating the braking signal includes a braking timer selectively operable in response to the free spool signal, and said circuit means includes an integrated circuit.

11. The fishing reel of claim 1, wherein the circuit means generates the braking signal after a preselected freely rotating spool interval commencing with spool rotation, the means for braking the spool is a dynamo, and further comprises a means for removing power to the timing means.

12. The fishing reel of claim 9, wherein the means for braking the spool is a dynamo, and means are provided for removing power to the timing means, and the means for removing power to the timing means is engaged when the spool rotates opposite to its rotation during a cast.

* * * * *